June 19, 1956

T. I. MOSELEY 2,751,146

AIR COMPRESSOR

Filed Oct. 29, 1951

INVENTOR.
TOMLINSON I. MOSELEY

BY

*Mellin and Hanscom*

ATTORNEYS

June 19, 1956

T. I. MOSELEY 2,751,146

AIR COMPRESSOR

Filed Oct. 29, 1951

INVENTOR.
TOMLINSON I. MOSELEY

BY

Mellin and Hanscom
ATTORNEYS

June 19, 1956 T. I. MOSELEY 2,751,146
AIR COMPRESSOR
Filed Oct. 29, 1951 3 Sheets-Sheet 3

INVENTOR.
TOMLINSON I. MOSELEY
BY
Mellin and Hanscom
ATTORNEYS

United States Patent Office 2,751,146
Patented June 19, 1956

2,751,146

AIR COMPRESSOR

Tomlinson I. Moseley, Atherton, Calif., assignor to Dalmo Victor Company, San Carlos, Calif., a corporation of California Application October 29, 1951, Serial No. 253,590

4 Claims. (Cl. 230—172)

This invention relates to air compressors and, while certain of the inventive concepts set forth are broadly applicable, the invention is particularly concerned with a compact, light-weight, efficient and effective air compressor for use in airplanes.

A main object of the present invention is to provide a high-capacity air compressor for use in low-pressure areas, such as at high altitudes.

In airborne equipment, particularly airborne radar equipment, special air compressors must be provided for supplying the wave guides and other parts of the radar equipment with air under pressure to provide a suitable dielectric in the wave guides and prevent breakdown at high-voltage points. The air pressure within the cabin of the plane is not sufficient to provide a suitable dielectric in the wave guide and, therefore, the need for special compressors for the wave guide equipment is realized.

It is also important that the air supplied to the wave guide equipment not be contaminated with lubricants or the like, since this would impair the dielectric qualities of the air. It is, therefore, a principal object of the present invention to provide an air compressor for supplying air under pressure to wave guide equipment without lubricants entrained therein.

At high altitudes, low temperatures are encountered and sticking of valves is frequently incurred. It is an object of the present invention to provide a compressor in which the piston is arranged to engage the outlet valve from the cylinder of the piston, thereby positively opening the valve.

In the usual air compressor, air trapped in the clearance space between the piston and cylinder head re-expands during the downward stroke of the piston, limiting the possible inflow of air during the intake stroke to an amount equal to the difference between that of the re-expanded volume of air trapped in the clearance space and the net volume swept by the piston during the intake stroke. At some particular altitude characteristic of the design, a compressor having cylinder clearance at top dead center is, therefore, unable to pump any air since the re-expanded volume of the clearance air eventually equals the full volume swept by the piston.

It is a main object of the present invention to provide a high-capacity air compressor by eliminating this clearance space by the provision of a piston which engages the outlet valve from the cylinder so that a zero clearance space is provided.

Another object of the present invention is to provide an air compressor having a small bore and long stroke so that the leakage around the piston ring will be reduced in comparison to the volume of the cylinder.

Another object of the present invention is to increase the volumetric efficiency of the compressor by the provision of crankcase compression to create a much greater pressure difference across the intake port during the brief interval which the latter is open.

Various other objects of the invention will be apparent from a consideration of the following specification taken in conjunction with the accompanying drawings, in which.

Figure 1:
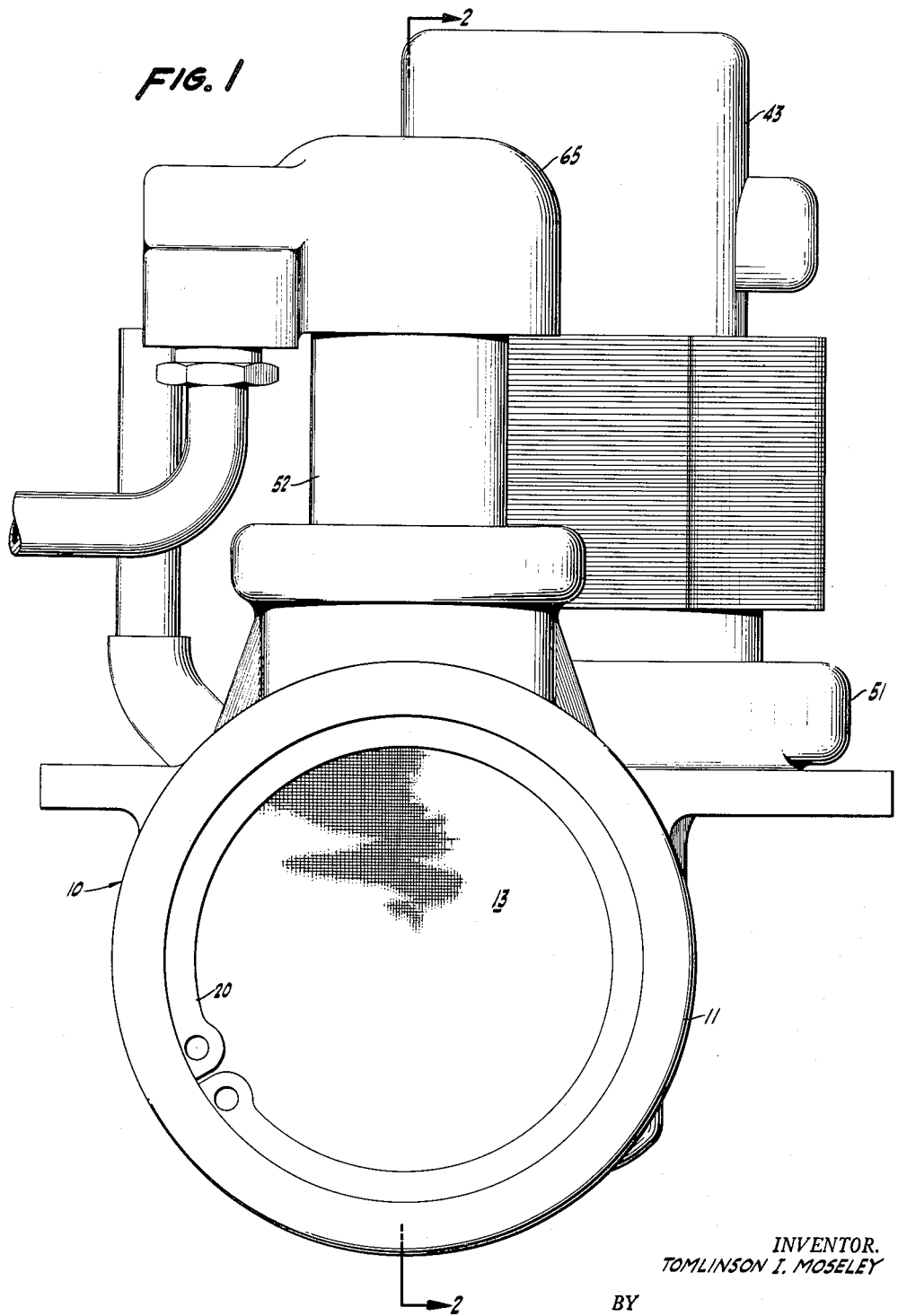
Fig. 1 is a front elevation of the compressor and a motor for driving the compressor.

In general terms, the compressor of the present invention includes a cylinder with a piston reciprocable therein. The piston is driven by a crankshaft having a throw sufficient to cause the piston to slightly protrude from the working end of the cylinder at the upper end of its stroke. The working end of the cylinder is closed by a spring-loaded outlet valve which is unseated by air compressed by the piston and engaged by the piston when the piston protrudes from the cylinder and follows the piston during the initial portion of its downward stroke, until seated against the cylinder, whereby a zero clearance is provided between the piston and outlet valve. Therefore, there is practically no air in the cylinder to re-expand during the downstroke of the piston, and accordingly the difference in pressures between the intake air and the re-expanded air is large at the time of uncovering of the intake port, and consequently the capacity of the compressor is increased.

The air compressor of the present invention is also arranged so that some of the lubricated parts are sealed from the crankcase and the remaining parts, which must be lubricated, are lubricated by self-lubricated bearings or, in case of the piston, by plastic piston rings, so that lubricants will not be entrained in the compressed air and, therefore, will not impair the dielectric qualities of the air in case the compressor is used for supplying air to wave-guide equipment.

Referring now more particularly to the drawings, the air compressor includes an air-tight housing 10 having a relatively short crankcase portion 11, which is open at 12 to the ambient air and provided with an air-screen filter 13. A flap valve body 14 having a central aperture 15, closes the opening 12 and has a loosely mounted flap valve 16 carried on pins 17 having heads 18 spaced to allow slight movement of the flap valve 16. The flap valve operates so that air is admitted through the screen 13 at aperture 15 on the upstroke of the piston and on the downstroke of the piston the valve closes, being a pressure-responsive valve, and crankcase compression takes place. The screen 13 and member 14 are secured in place within a counterbore 19 by a split ring 20 receivable within a groove 21, there being a suitable sealing member 22 behind the member 14 for sealing purposes.

Figure 2:
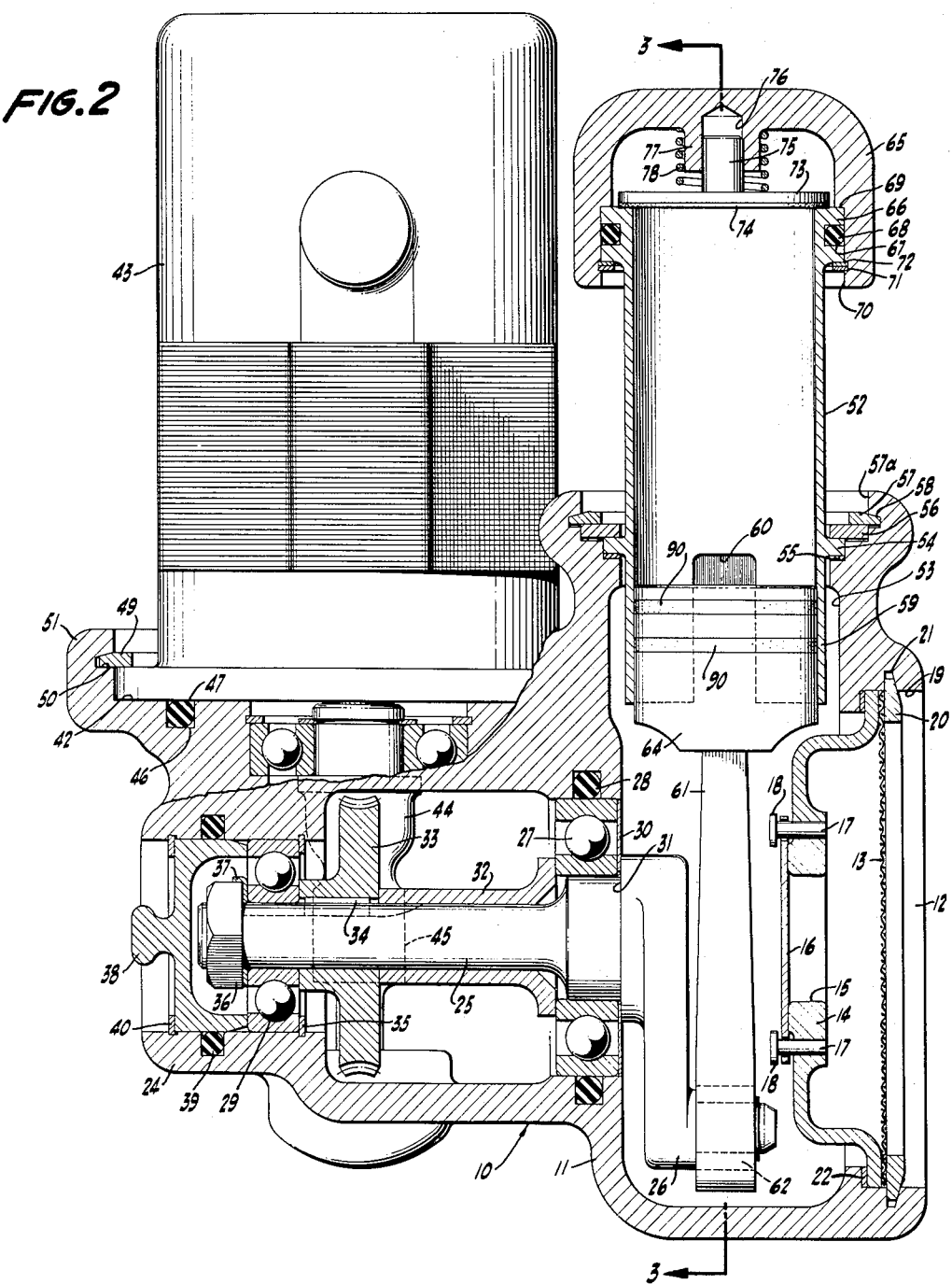
Fig. 2 is a vertical section of the compressor shown in Fig. 1, taken along the line 2—2 of Fig. 1.

The housing 10 includes a gearcase portion indicated at 24 within which there is mounted a crankshaft 25 having a crank arm 26 disposed within the crankcase portion 11 of the housing 10, as best shown in Fig. 2. The crankshaft 25 is supported within gearcase 24 by a bearing 27, mounted in housing 11 and sealed with respect thereto by an O-ring seal 28, and a bearing 29 at the outer end of the shaft, mounted in gearcase 24. In addition to the O ring seal at 28 between gearcase 24 and the crankcase housing 11, there is provided a flat, circular sealing annulus 30, the forward face of which abuts the inner face 31 of the crank arm 26, and the opposite face of which engages the front face of bearing 27. The inner peripheral margin of the sealing annulus 30 is clamped between the inner race of bearing 27 and the face 31 of crank arm 26, and the outer peripheral margin of sealing annulus 30 frictionally engages and rotates with respect to the outer race of bearing 27. The outer race protrudes to the right as the parts are depicted in Fig. 2, so that a good contact between the annulus and outer race is obtained.

The clamping arrangement for annulus 30 includes a crankshaft sleeve 32, a worm gear 33, the inner race of bearing 29, a lock washer 37 and a nut 36 on the outer end of crankshaft 25. The assembly just mentioned is retained against axial movement by means of a split ring 35 engaging one side of bearing 29 and being received within a groove in gearcase 24, and a closing cap 38 engaging the opposite side of bearing 29 and being retained in place by means of a split ring 40 also received within a groove in gearcase 24, as best shown in Fig. 2. An O ring 39 seals between cap 38 and gearcase 24. The crankshaft housing is provided with a suitable lubricant to lubricate the bearings 27 and 29 and worm gear 33 and its driving worm 45. The lubricants in the gearcase 24 are sealed from the crankcase housing 11 by means of the O ring 28 and sealing annulus 30.

The worm gear 33 is keyed to shaft 25 by suitable key 34. The worm gear 33 is driven by means of a motor 43 which is secured to a flange 51 of gearcase 24 by means of a split ring 49 receivable in a groove 50, said motor bearing against a surface 42 and being sealed by an O ring 47 fitting within an annular groove 46. The motor 43 drives the worm gear 33 by means of a motor shaft 44 and worm gear 45 indicated in dotted lines in Fig. 2.

A cylinder 52 is mounted on the crankcase housing 11 and extends through an opening 53 in the housing. Cylinder 52 has a flange 54 and a sealing member 55 below the flange, and cylinder 52 is secured to crankcase housing 11 by means of split rings 56 and 57 receivable respectively in counterbore 57a and a groove 58.

The lower skirt portion 59 of the cylinder 52 is provided with a pair of diametrically opposed slots 60 which are arranged to accommodate side movement of a piston connecting rod 61, which is secured to crank arm 26 by means including a self-lubricated bearing 62. The upper end of piston connecting rod 61 is connected to the piston pin 63 of a piston 64 by means including self-lubricated bearing 63a, shown in Fig. 3.

Piston 64 is reciprocated by the crank 26 so as to uncover the upper ends of slots 60, at the lower end of its stroke, to permit air to enter the cylinder from the crankcase 11.

The top of the cylinder 52 is enclosed by a cylinder head 65, which engages a top flange 66 formed on the cylinder, which flange is grooved at 67 to receive an O ring 68. The cylinder head 65 is secured in position by a shoulder 69 at the end of the counterbore 70, which shoulder engages the flange 66. The cylinder head is retained on the cylinder by means of a split ring 71 seated within a groove 72.

The top of the cylinder is normally closed and sealed by a flat disc valve 73, the lower face of which is preferably provided with a rubber or like resilient sealing pad 74, the diameter of the disc valve and its sealing pad 74 being slightly greater than the bore of the cylinder to enable sealing or closing of the bore of the cylinder when the valve is seated. The valve 73 is carried by the valve stem 75 slidably received within a bore 76 provided in a boss 77 on the cylinder head 65. There is a compression spring 78 arranged to urge the valve 73 into sealing engagement with the upper face of the cylinder.

Figure 3:
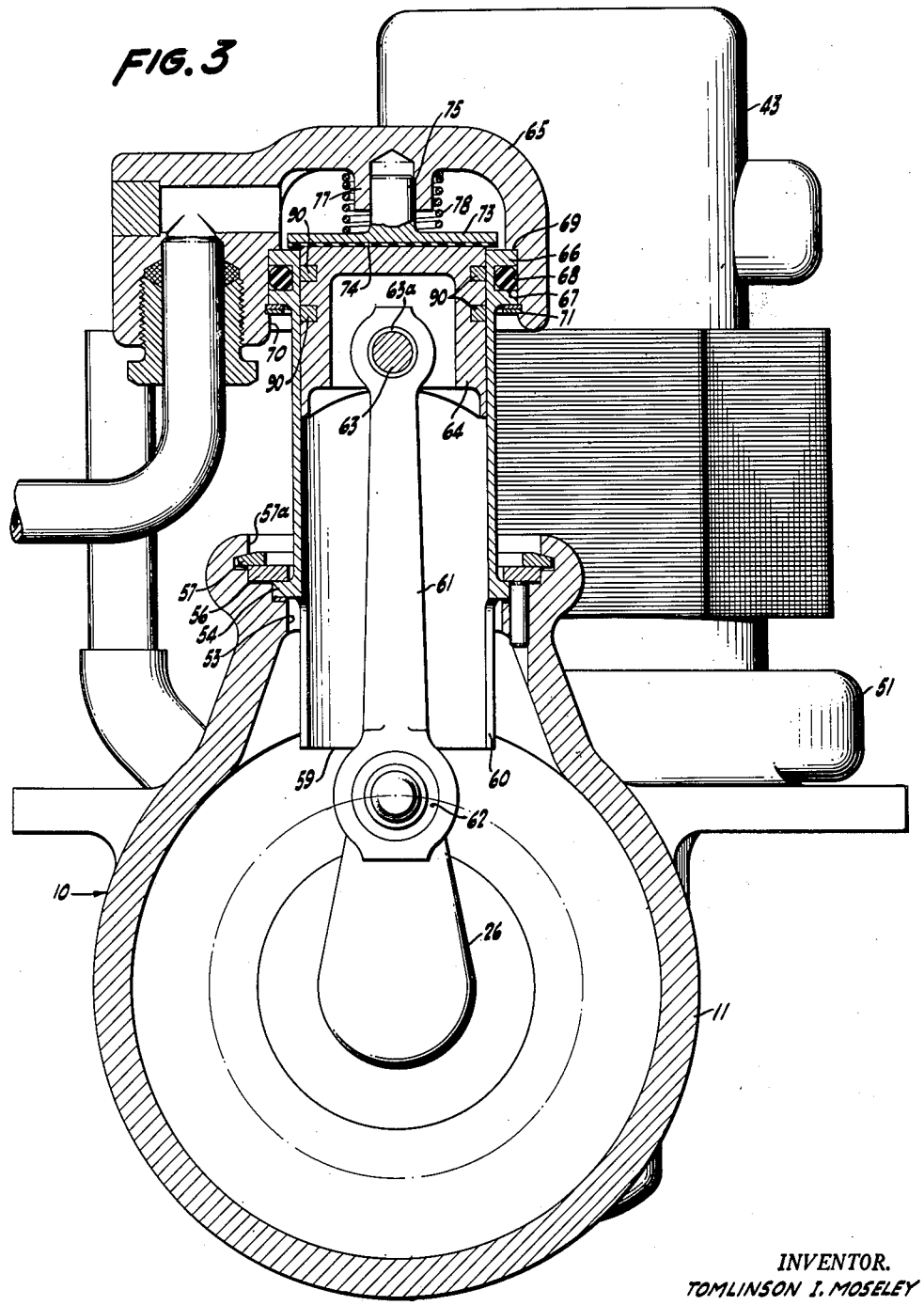
Fig. 3 is a vertical section taken along line 3—3 of Fig. 2.

The operation of the device is as follows: Piston 64 is reciprocated so as to partially uncover slots 60 at the bottom of its stroke, as shown in Fig. 2, and to slightly protrude from the cylinder bore at the top of its stroke, as shown in Fig. 3.

Valve 73 will be unseated when the force on the under side of the valve produced by the pressure of the air in the cylinder is greater than the combined forces on the upper side of the valve produced by spring 78 and the pressure of the air in cylinder head 65. After valve 73 unseats, it is engaged by piston 64 when the piston protrudes from the cylinder.

If valve 73 becomes stuck, piston 64 will engage and positively unseat the valve when piston 64 protrudes from the cylinder.

During the downstroke of piston 64, valve 73 under the influence of spring 78 follows piston 64 downwardly until valve 73 seats against cylinder 52. Consequently, there is a zero clearance between the piston and the valve. Therefore, there is a negligible amount of air in the cylinder to re-expand during the downstroke of piston 64 and the pressure of the re-expanded air is consequently negligible. During the further downstroke of piston 64, the pressure-responsive flap valve 16 is closed by the increasing pressure in the crankcase 11 and, therefore, crankcase compression takes place. When the upper ends of slots or ports 60 are uncovered, the air under compression in the crankcase rushes into the cylinder through the ports 60 and immediately thereafter the piston rises to close off the ports 60. During the upstroke of piston 64, pressure within the crankcase drops and, therefore, the pressure-responsive valve 16 opens to allow air to flow into the crankcase 11.

The piston 64 is provided with continuous unbroken plastic piston rings 90, which can in some instances be applied to the piston 64 by stretching the piston rings. Preferably, however, the piston 64 is of built-up construction having a separable piston head to enable easy assembly of the piston parts and the unbroken rings. These piston rings do not require lubrication and are made from a material such as polychlorotrifluoroethylene or polytetrafluoroethylene. This type of plastic piston ring is self-lubricating and incurs no change of state up to 500° F. or more, and serves to effectively seal the piston within the cylinder so that leakage of air from above the piston to the lower portion of the cylinder is prevented. The rings 90 also coat the walls of the bore of the cylinder to augment this sealing effect.

By sealing off the lubricants in the gearcase 24 and by the use of self-lubricated bearings in the crankcase and plastic rings for the piston, no lubricants will be entrained in the compressed air, thereby avoiding impairing the dielectric qualities of the air and coating of the interior surfaces of the wave guide.

By the present invention, an air compressor has been provided having a zero clearance between the piston and outlet valve, therefore reducing to practically zero the amount of air in the cylinder for re-expansion during the downstroke of the piston, so that the volume of intake air per stroke is increased to thereby increase the capacity of the compressor. Of course, the crankcase compression also increases the amount of intake air, and, therefore, a very high capacity air compressor is provided which can supply air at sufficient pressure to provide a suitable dielectric for wave-guide equipment. Although the invention has been described in connection with supplying air for wave-guide equipment, the compressor obviously has other uses. It is pointed out that, by the provision of the small bore elongated cylinder 52, the leakage around the piston rings 90 is reduced, when compared to the leakage around the larger-diameter piston rings operating in a larger bore but shorter cylinder of the same volume.

Having thus described my invention, what I claim and desire to secure by Letters Patent is:

1. An air compressor of high volumetric efficiency comprising a cylinder, a piston within the cylinder, piston rings on said piston, said piston rings being made of a self-lubricating plastic material, means for reciprocating the piston in a manner such as to cause the piston to slightly protrude from the bore of the cylinder at the upper end of its stroke, a spring-pressed valve closing the bore of the cylinder at the top thereof and engaged by the piston when the piston is at the upper end of its stroke, a flat pad of elastomer material fixed to the underside of said valve, an air-tight housing including a crankcase enclosing the lower end of the cylinder, means for opening the portion of the cylinder bore above the piston to the housing when the piston is near the bottom of its stroke, and a pressure-responsive valve in the housing for opening the housing to ambient air during at least a portion of the upward stroke of the piston, and for closing the housing against the egress of air from the housing during at least a portion of the downward stroke of the piston to thereby provide crankcase compression.

2. An air compressor of high volumetric efficiency comprising a cylinder, a piston within the cylinder, an air-tight housing including a crankcase enclosing the lower end of the cylinder, a crankshaft extending into the housing in sealed relation with respect to the housing, a crank arm connected to said crankshaft, a connecting rod connecting said crank arm to said piston by means including self-lubricated bearings, said crank having a throw sufficient to cause the piston to protrude from the top of the cylinder at the upper end of its stroke, a spring-pressed valve closing the cylinder at the top thereof and engageable by the piston when the piston is at the upper end of its stroke, a flat pad of elastomer material fixed to the underside of said valve, a pressure-responsive valve having a large effective valve area in the housing, said valve being responsive to minute differential pressures for opening the housing to ambient air during at least a portion of the upward stroke of the piston and for closing the housing against egress of air from the housing during at least a portion of the downward stroke of the piston to thereby provide crankcase compression, and continuous, unbroken piston rings on said piston sealingly engaging said cylinder, said piston rings being made of a self-lubricating plastic.

3. An air compressor as set forth in claim 2 wherein the piston rings are made of polytetrafluoroethylene.

4. An air compressor of high volumetric efficiency comprising an elongated small-bore cylinder, a piston within the cylinder, piston rings on said piston, said piston rings being made of a self-lubricating plastic, a crankshaft having a crank with a relatively large crank diameter for driving the piston, a connecting rod connecting the crank to the piston, the walls of the cylinder being slotted upwardly from the bottom thereof at two places diametrically opposite each other in the plane of the crank throw to accommodate the connecting rod during its movement, an air-tight and oil-tight housing enclosing the lower end of the cylinder at a point above the slots whereby the slots serve when the piston is at the bottom of its stroke as intake air passages, means for opening the housing to the atmosphere during at least a portion of the upward stroke of the piston.

References Cited in the file of this patent
UNITED STATES PATENTS

| | | |
|---|---|---|
| 319,647 | Weatherhead | June 9, 1885 |
| 480,811 | Duffy | Aug. 16, 1892 |
| 512,788 | Ashwell | Jan. 16, 1894 |
| 855,050 | Dietrich | May 28, 1907 |
| 880,746 | Meriam | Mar. 3, 1908 |
| 930,838 | Christie | Aug. 10, 1909 |
| 970,487 | Gardner | Sept. 20, 1910 |
| 1,013,348 | Whitaker | Jan. 2, 1912 |
| 1,021,310 | Hawthorne | Mar. 26, 1912 |
| 1,117,708 | Schou | Nov. 17, 1914 |
| 1,260,100 | Udell | Mar. 19, 1918 |
| 1,523,098 | Arnold | Jan. 13, 1925 |
| 1,770,273 | Keema | July 8, 1930 |
| 1,991,460 | Herzmark | Feb. 19, 1935 |
| 2,176,691 | Simons | Oct. 17, 1939 |
| 2,436,854 | Corey | Mar. 2, 1948 |
| 2,499,952 | Harbison | Mar. 7, 1950 |

FOREIGN PATENTS

| | | |
|---|---|---|
| 506,623 | France | Del' June 2, 1920 |